United States Patent
Mazina et al.

(10) Patent No.: US 8,370,688 B2
(45) Date of Patent: Feb. 5, 2013

(54) IDENTIFYING A STORAGE DEVICE AS FAULTY FOR A FIRST STORAGE VOLUME WITHOUT IDENTIFYING THE STORAGE DEVICE AS FAULTY FOR A SECOND STORAGE VOLUME

(75) Inventors: Daniel J. Mazina, Spring, TX (US); Jay E. Allison, Jr., Spring, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 181 days.

(21) Appl. No.: 12/765,088

(22) Filed: Apr. 22, 2010

(65) Prior Publication Data

US 2010/0275066 A1 Oct. 28, 2010

Related U.S. Application Data

(60) Provisional application No. 61/171,896, filed on Apr. 23, 2009.

(51) Int. Cl.
*G06F 11/00* (2006.01)
(52) U.S. Cl. .............. 714/42; 714/6.2; 714/54
(58) Field of Classification Search .............. 714/6.1, 714/6.13, 6.2, 6.21, 6.23, 6.24, 42, 54; 711/114
See application file for complete search history.

(56) References Cited

U.S. PATENT DOCUMENTS

| | | | |
|---|---|---|---|
| 5,754,756 A * | 5/1998 | Watanabe et al. | 714/6.21 |
| 6,138,125 A | 10/2000 | DeMoss | |
| 6,751,136 B2 * | 6/2004 | Hetrick et al. | 714/6.2 |
| 6,799,245 B1 * | 9/2004 | Kochiya | 714/6.23 |
| 8,065,558 B2 * | 11/2011 | Zwisler et al. | 714/6.2 |
| 2003/0070041 A1 | 4/2003 | Beardsley | |
| 2006/0107103 A1 * | 5/2006 | Rodrigues et al. | 714/7 |
| 2008/0126839 A1 * | 5/2008 | Sangapu et al. | 714/5 |

OTHER PUBLICATIONS

Wikipedia, RAID (Redirected from Redundant Array of Independent Disks), dated on or before Mar. 10, 2009 (12 pages).
Symantec Corporation, Veritas Volume Manager—Administrator's Guide—Solaris—5.0 Maintenance Pack 3 (Chapters 1-4) (Sep. 2008).
Symantec Corporation, Veritas Volume Manager—Administrator's Guide—Solaris—5.0 Maintenance Pack 3 (Chapters 5-9) (Sep. 2008).
Symantec Corporation, Veritas Volume Manager—Administrator's Guide—Solaris—5.0 Maintenance Pack 3 (Chapters 10-16 and appendices) (Sep. 2008).

* cited by examiner

*Primary Examiner* — Joseph D Manoskey

(57) ABSTRACT

Storage volumes are provided across a plurality of storage devices, where the storage volumes include at least a first storage volume and a second storage volume. A storage controller detects fault in a portion of a particular one of the plurality of storage devices, where the portion corresponds to the first storage volume. The storage controller identifies the particular storage device as faulty for the first storage volume without identifying the particular storage device as faulty for the second storage volume.

18 Claims, 2 Drawing Sheets

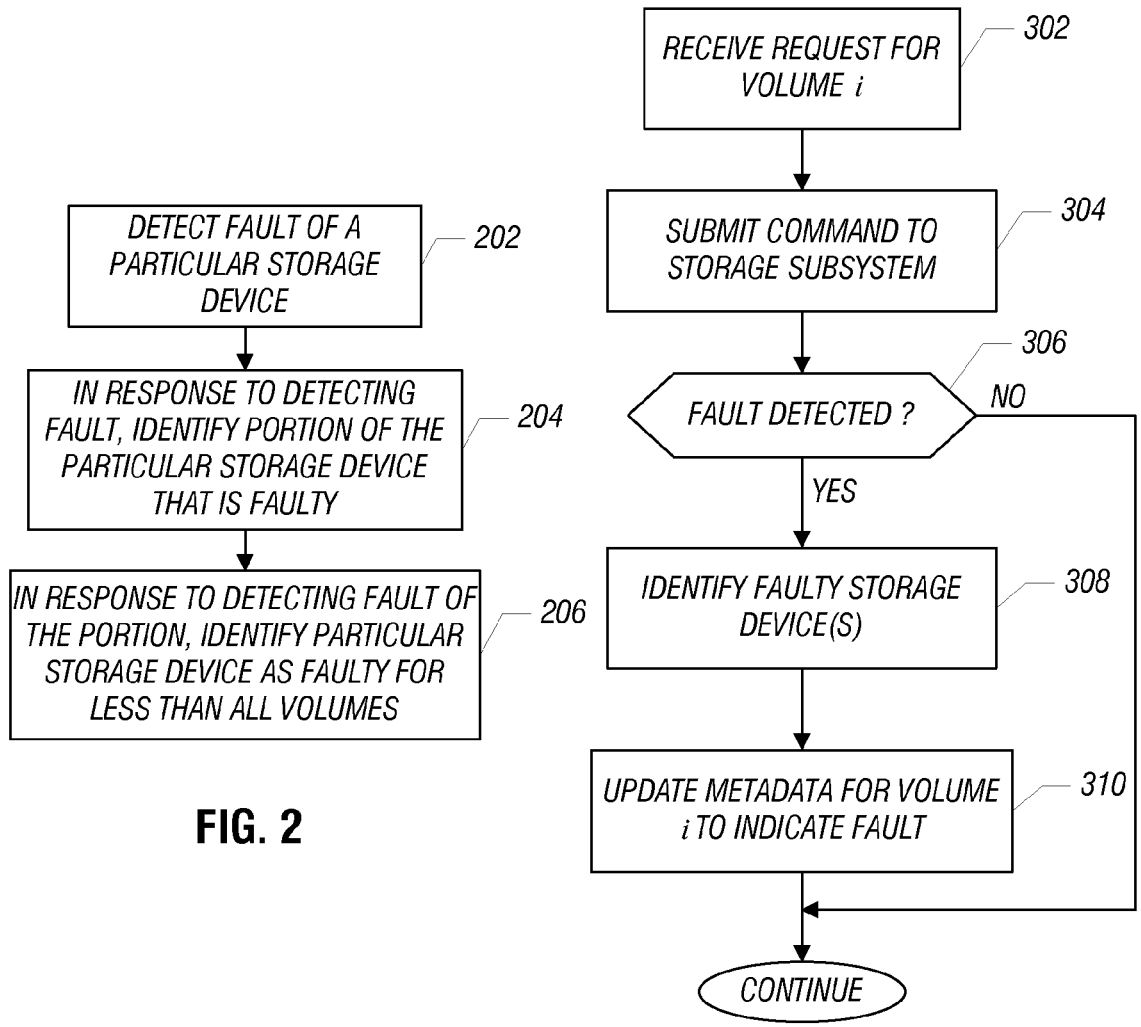

IDENTIFYING A STORAGE DEVICE AS FAULTY FOR A FIRST STORAGE VOLUME WITHOUT IDENTIFYING THE STORAGE DEVICE AS FAULTY FOR A SECOND STORAGE VOLUME

CROSS-REFERENCE TO RELATED APPLICATION

This application claims the benefit under 35 U.S.C. §119(e) of U.S. Provisional Application Ser. No. 61/171,896, filed Apr. 23, 2009, which is hereby incorporated by reference.

BACKGROUND

A storage subsystem can be implemented with multiple (e.g., an array of) physical storage devices. A storage volume, which is a logical unit of data, can be implemented across the physical storage devices. One reason for implementing a storage volume across plural physical storage devices is to provide redundancy, such as redundancy based on mirroring data (in which data of a first storage device is copied to a second storage device to provide redundancy). Another form of redundancy is parity-based redundancy (in which parity information of data stored in a group of storage devices is kept in another storage device). By providing redundancy, if a physical storage device (or any part of a physical storage device) from the multiple physical storage devices were to fail, then the data stored in the storage subsystem can still be recovered under certain conditions.

Conventionally, upon detection of a storage device (from among the plural storage devices used to implement storage volumes) as failed, the storage device is marked as failed and rendered unavailable for further use by any of the storage volumes.

BRIEF DESCRIPTION OF THE DRAWINGS

Some embodiments of the invention are described with respect to the following figures:

FIGS. 2-3 are flow diagrams of processes of partially failing a storage device in response to detecting a fault of a portion of the storage device, according to some embodiments.

DETAILED DESCRIPTION

Figure 1:
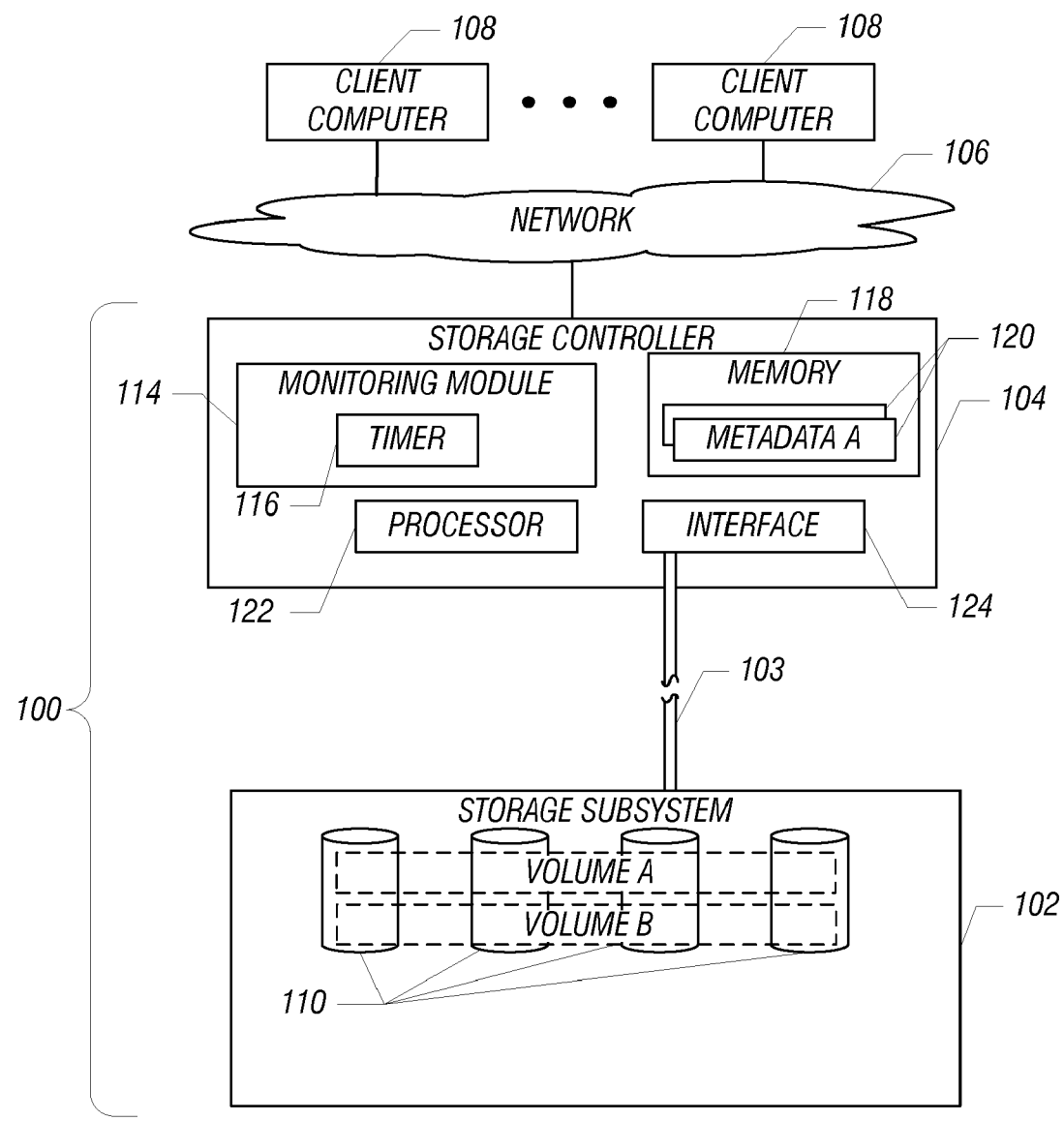
FIG. 1 is a block diagram of an exemplary arrangement that includes an embodiment according to an invention.

A storage subsystem includes multiple (e.g., an array of) storage devices on which storage volumes can be implemented. A "storage volume" (or more simply "volume") refers to a logical unit of data that is defined in the storage subsystem. A storage volume that is defined across multiple storage devices allows for redundancy to be provided. Redundancy can be based on mirroring of data, where data in a source storage device is copied to a mirror storage device (which contains a mirror copy of the data in the source storage device). In this arrangement, if an error causes data of the source storage device to be unavailable, then the mirror storage device can be accessed to retrieve the data.

Another form of redundancy is parity-based redundancy where actual data is stored across a group of storage devices, and parity information associated with the data is stored in another storage device. If data within any of the group of storage devices were to become inaccessible (due to data error or storage device fault or failure), the parity information can be accessed to reconstruct the data. Examples of parity-based redundancy schemes include RAID (redundant array of inexpensive disks) schemes, including the RAID-5 and RAID-6 schemes. An example of a mirroring redundancy scheme is the RAID-1 scheme. Although reference is made to RAID in this description, it is noted that some embodiments of the invention can be applied to other types of redundancy schemes, or to any arrangement in which a storage volume is implemented across multiple storage devices (whether redundancy is used or not).

As used here, the term "storage device" refers to a physical storage element, such as a disk-based storage element (e.g., hard disk drive, optical disk driver, etc.) or other type of storage element (e.g., semiconductor storage element). The multiple storage devices within a storage subsystem can be arranged as an array, in some exemplary implementations. More generally, a storage subsystem refers to a collection of storage devices, where such collection of storage devices can be contained within an enclosure (defined by an external housing of the storage subsystem). Alternatively, the storage devices of a storage subsystem can be located in multiple enclosures.

Conventionally, when any portion of a particular storage device (from among multiple storage devices on which storage volumes are implemented) is detected as failed or exhibiting some other fault, the entirety of the particular storage device is marked as unavailable for use. As a result, all of the storage volumes will be unable to use the particular storage device.

A "fault" of a storage device refers to any error condition that prevents access of a portion of the storage device. The error condition can be due to a hardware or software failure that prevents access of the portion of the storage device. In many cases, a fault in a particular storage device can be localized to a storage region (a contiguous region or a collection of non-contiguous regions) of the storage device—in other words, the fault can be present in one (or more) regions of the particular storage device, while the remaining regions of the particular storage device remain functional. In such cases, failing the entirety of the particular storage device such that all storage volumes are unable to use the particular storage device is inefficient.

In accordance with some embodiments of the invention, a mechanism is provided to partially fail the particular storage device if a partial fault is detected such that at least one of the storage volumes implemented across a collection of storage devices that includes the particular storage device can continue to use the particular storage device. For example, storage volume A and storage volume B may be implemented across a collection of storage devices X, Y, and Z. If a partial fault is detected in storage device X (where part of the storage device X remains functional), then the mechanism according to some embodiments is able to mark just part of storage device X as unavailable. If this part corresponds to storage volume A, then storage device X becomes unavailable to storage volume A, and storage device X is marked as faulty for storage volume A. However, storage volume B can continue to use storage device X (in other words, storage device X is not marked as faulty for storage volume B).

FIG. 1 illustrates an exemplary arrangement that includes a storage arrangement 100 that has a storage subsystem 102 connected by a link 103 to a storage controller 104. The link 103 can be one of several different types of links. As examples, the link 103 can be a SCSI (Small Computer System Interface) link, a serial attached SCSI (SAS) link, a Fibre Channel link, and so forth.

The storage controller 104 is connected to a network 106 (e.g., local area network, storage area network, or other type of network) to allow client computers 108 to access the storage controller 104. The client computers 108 can issue read, write, or other input/output (I/O) requests over the network 106 to the storage controller 104. In response to such requests, the storage controller 104 accesses the storage subsystem 102 to perform the requested accesses. The client computers 108 can be user computers, or alternatively, the client computers 108 can be server computers that are accessible by user computers.

The storage subsystem 102 includes an array of storage devices 110. A number of volumes can be defined across the storage devices 110. In the example of FIG. 1, two volumes are shown, including volume A and volume B. In an alternative implementation, just one volume can be defined across the storage devices 110, or more than two volumes can be defined across the storage devices 110. Although both volumes A and B are deployed across the same set of storage devices 110, it is noted that in an alternative implementation, volume A can be implemented across a first collection of the storage devices 110, and volume B can be implemented across a second collection of the storage devices 110. Volumes A and B may be RAID volumes, such as RAID-1, RAID-5, or RAID-6 volumes.

The storage controller 104 includes a monitoring module 114 according to some embodiments for monitoring for faults associated with the storage subsystem 102. The faults associated with the storage subsystem 102 include failure or other faults of individual ones of the storage devices 110. In response to detecting a fault of any particular storage device 110, the monitoring module 114 can determine which part(s) of the storage device has failed.

The storage controller 104 also includes a memory 118 in which metadata 120 associated with corresponding volumes in the storage subsystem 102 can be stored. For volumes A and B, the metadata 120 can include metadata A and metadata B. Each metadata A or B includes information regarding fault associated with any of the storage devices 110 on which the corresponding volume A or B is implemented.

The metadata for each volume can also include one or more of the following information: information relating to which storage device(s) of the storage volume has been replaced; information relating to the status of redundancy for the storage volume (e.g., status of building of RAID-5 or RAID-6 parity information, status of mirroring of data for RAID-1 redundancy); and so forth.

The storage controller 104 also includes an interface 124 to allow communication with the storage subsystem 102 over the link 103. The interface 124 can include a network interface controller and any communication protocol stacks.

The storage controller 104 can be a processor-based system that includes a processor 122. The monitoring module 114 can be a software module executable on the processor 122. In a different embodiment, the storage controller 104 can be implemented with a hardware device such as an application specific integrated circuit (ASIC), programmable gate array (PGA), and so forth. In this case, the monitoring module 114 can be firmware embedded in the storage controller 104, or alternatively the monitoring module 114 can be implemented as fixed circuitry in the storage controller 104.

FIG. 2 illustrates a general process according to an embodiment. The process of FIG. 2 can be performed by the monitoring module 114 in the storage controller 104 of FIG. 1. The storage controller 104 detects (at 202) a fault in a particular storage device (that is part of a collection of storage devices 110 on which volumes A and B as shown in FIG. 1 are implemented). For example, the storage controller 104 may have submitted a request to a particular one of the storage devices 110 in the storage subsystem 102. If the storage device fails to respond after some amount of time (which can be detected by expiration of a timer 116 in the monitoring module 114 in FIG. 1), then that is an indication of fault of the storage device.

A storage device can experience faults for various reasons. A physical component of the storage device may fail, such as failure of a power supply, failure of a mechanical part, failure of a software component, failure of a part of storage media, and so forth. Some of the component failures above can cause the entire storage device to become inaccessible, in which case the storage device has experienced a total failure. On the other hand, some other failures may cause just a localized portion of the storage device to become inaccessible.

In response to detecting the fault of the particular storage device, the storage controller identifies (at 204) a portion of the storage device that is faulty. The portion that is faulty can be less than the entirety of the particular storage device. In response to detecting fault of a portion less than the entirety of the particular storage device, the monitoring module 114 identifies (at 206) the particular storage device as failed for less than all the volumes implemented across the collection of storage devices that includes the particular storage device. For example, if the faulty portion corresponds to volume A but not volume B, then the particular storage device is identified as faulty for volume A but the particular storage device is not identified as faulty for volume B. Identifying a storage device as being faulty (unavailable) can be performed by updating the metadata 120 in the memory 118 of the storage controller 104 to indicate that the storage device is failed. In the foregoing example, metadata A is updated to indicate that the particular storage device is faulty, whereas metadata B does not indicate that the particular storage device is faulty.

FIG. 3 is a process of a process of partially failing a storage device in response to detecting a fault of a portion of the storage device, according to another embodiment. The storage controller 104 receives (at 302) a request to access volume i in the storage subsystem 102, where i can be either A or B in the example of FIG. 1. In response to the received request, the storage controller 104 submits (at 304) a command (e.g., read command, write command, delete command, etc.) to the storage subsystem 102 to perform the requested action.

The monitoring module 114 in the storage controller 104 determines (at 306) if a fault has occurred. For example, the storage subsystem 102 may not respond for greater than some predefined period of time, which causes the timer 116 in the monitoring module 114 to expire. This is an indication of fault.

The monitoring module 114 next identifies (at 308) which of the storage device(s) is faulty. For example, the monitoring module 114 may expect response data back from a particular storage device, but such response data is never received. In this case, the particular storage device that does not respond is identified as a faulty device for volume i. The monitoring module 114 then updates (at 310) the metadata for volume i to indicate that the particular storage device is faulty for volume i. Note, however, that the metadata for the other volume(s) are left unchanged such that the other volume(s) can continue to use the particular storage device marked as faulty for volume i.

Subsequently, it may be the case that the particular storage device is identified as faulty for another volume when such other volume is being accessed (based on repeating the tasks of FIG. 3 for such other volume). The particular storage device can then be marked as faulty for such other volume at that time.

In this way, an efficient mechanism is provided to partially fail a storage device for a first volume but not for at least a second volume. This provides failure isolation such that the second volume can continue to use the storage device even though the first volume is unable to do so. The partial failure of a storage device among storage volumes is possible since storage volumes employ unique, non-overlapping regions of the storage device.

A storage volume that has redundancy prior to fault of a storage device can continue to function as a non-fault-tolerant volume after fault of the storage device. However, a storage volume that is non-fault-tolerant prior to fault of the storage device will fail as a result of the fault.

Instructions of software described above (including the monitoring module 114 of FIG. 1) are loaded for execution on a processor (such as processor 122 in FIG. 1). The processor includes microprocessors, microcontrollers, processor modules or subsystems (including one or more microprocessors or microcontrollers), or other control or computing devices. As used here, a "processor" can refer to a single component or to plural components (e.g., one CPU or multiple CPUs).

Data and instructions (of the software) are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A system comprising:
    a plurality of storage devices;
    storage volumes provided across the plurality of storage devices, wherein the storage volumes include at least a first storage volume and a second storage volume; and
    a storage controller to:
        detect fault in a portion of a particular one of the plurality of storage devices, wherein the portion corresponds to the first storage volume; and
        identify the particular storage device as faulty for the first storage volume without identifying the particular storage device as faulty for the second storage volume, wherein the first storage volume is no longer accessible on the particular storage device identified as being faulty and the second storage volume is accessible on the particular storage device identified as being faulty, wherein detection of the fault corresponding to the first storage volume occurs before identification of the particular storage device as faulty for the first storage volume.

2. The system of claim 1, wherein the fault in the portion of the particular storage device comprises a fault in a storage region of the particular storage device that affects the first storage volume but does not affect the second storage volume.

3. The system of claim 1, wherein the fault is detected based on sending a command to access the particular storage device and not receiving a response from the particular storage device.

4. The system of claim 3, wherein the storage controller includes a timer, wherein expiration of the timer indicates that the response from the particular storage device has not been received.

5. The system of claim 1, wherein the storage controller is to update metadata associated with the first storage volume in response to detecting fault in the portion of the particular storage device, wherein the updated metadata indicates that the particular storage device is faulty for the first storage volume.

6. The system of claim 5, wherein the metadata associated with the second storage volume does not indicate the particular storage device as faulty for the second storage volume.

7. The system of claim 6, wherein the metadata for each of the storage volumes further specifies a status of redundancy for the corresponding storage volume.

8. The system of claim 7, wherein the status of redundancy for the corresponding storage volume includes a status of building RAID (Redundant Array of Inexpensive Disks) parity or mirroring information.

9. The system of claim 1, wherein the storage controller is to further:
    receive a request to access the first storage volume;
    in response to the request, send a command to the first storage volume, wherein detecting the fault of the portion of the particular storage device is based on a response to the command.

10. A method of isolating a fault of a particular storage device that is part of a collection of storage devices, comprising:
    storing plural storage volumes including a first storage volume across the collection of storage devices;
    detecting a fault in the particular storage device;
    determining that the fault affects the first storage volume; and
    in response to detecting the fault, identifying the particular storage device as faulty for the first storage volume without identifying the particular storage device as faulty for a remainder of the plural storage volumes, wherein the first storage volume is no longer accessible on the particular storage device identified as being faulty and the second storage volume is accessible on the particular storage device identified as being faulty, wherein determining that the fault affects the first volume occurs before identification of the particular storage device as faulty for the first storage volume.

11. The method of claim 10, further comprising receiving a request to access the first storage volume, wherein determining that the fault affects the first storage volume is based on processing of the request.

12. The method of claim 10, further comprising;
updating metadata associated with the first storage volume without updating metadata associated with the remainder of the plural storage volumes in response to detecting the fault.

13. The method of claim 12, wherein updating the metadata comprises updating the metadata that contains information relating to RAID (Redundant Array of Inexpensive Disks) redundancy.

14. The method of claim 11, further comprising:
receiving a second request to access a second one of the storage volumes;
detecting a fault in the particular storage device when processing the second request; and
in response to detecting the fault when processing the second request, identifying the particular storage device as faulty for the second storage volume.

15. An article comprising at least one non-transitory machine-readable storage medium containing instructions that upon execution cause a storage controller to:
receive a request to access a first volume of plural volumes implemented across a collection of storage devices;
receive an indication of a fault of a particular storage device in the collection of storage devices; and
in response to receiving the indication of fault, identify the particular storage device as unavailable for the first volume without identifying the particular storage device as unavailable for a remainder of the plural volumes, wherein the first storage volume is no longer accessible on the particular storage device identified as being faulty and the second storage volume is accessible on the particular storage device identified, as being faulty, wherein receipt of an indication of the fault in a first volume of the storage device occurs before identification of the particular storage device as unavailable for the first volume.

16. The article of claim 15, wherein identifying the particular storage device as unavailable comprises updating metadata associated with the first volume to indicate that the particular storage device has failed.

17. The article of claim 16, wherein the instructions upon execution cause the storage controller to:
update the metadata associated with the first volume in response to receiving the indication of fault without updating metadata associated with the remainder of the plural volumes to indicate that the particular storage device has failed.

18. The article of claim 15, wherein the instructions upon execution cause the storage controller to further:
receive a second request to access a second volume of the plural volumes;
receive an indication of a fault of a particular storage device in the collection of storage devices in response to processing of the second request; and
in response to receiving the indication of fault in response to processing the second request, identify the particular storage device as unavailable for the second volume.

* * * * *

UNITED STATES PATENT AND TRADEMARK OFFICE
CERTIFICATE OF CORRECTION

| | |
|---|---|
| PATENT NO. | : 8,370,688 B2 |
| APPLICATION NO. | : 12/765088 |
| DATED | : February 5, 2013 |
| INVENTOR(S) | : Daniel J. Mazina et al. |

It is certified that error appears in the above-identified patent and that said Letters Patent is hereby corrected as shown below:

In the Claims:

In column 8, line 3, in Claim 15, delete "identified," and insert -- identified --, therefor.

Signed and Sealed this
Seventh Day of May, 2013

Teresa Stanek Rea
*Acting Director of the United States Patent and Trademark Office*